United States Patent
Perriam et al.

(10) Patent No.: US 12,228,658 B2
(45) Date of Patent: Feb. 18, 2025

(54) METHOD OF DETERMINING AND DISTRIBUTING PERFORMANCE OF GNSS PREDICTION DATA

(71) Applicant: RX NETWORKS INC., Vancouver (CA)

(72) Inventors: Christopher Anthony Perriam, Vancouver (CA); Vijaykumar Bellad, Vancouver (CA)

(73) Assignee: RX NETWORKS INC., Vancouver (CA)

( * ) Notice: Subject to any disclaimer, the term of this patent is extended or adjusted under 35 U.S.C. 154(b) by 148 days.

(21) Appl. No.: 17/674,315

(22) Filed: Feb. 17, 2022

(65) Prior Publication Data
US 2022/0268945 A1    Aug. 25, 2022

Related U.S. Application Data

(60) Provisional application No. 63/151,315, filed on Feb. 19, 2021.

(51) Int. Cl.
*G01S 19/27* (2010.01)
*G01S 19/25* (2010.01)
*G01S 19/26* (2010.01)

(52) U.S. Cl.
CPC .......... *G01S 19/27* (2013.01); *G01S 19/258* (2013.01); *G01S 19/26* (2013.01)

(58) Field of Classification Search
CPC .......... G01S 19/27; G01S 19/26; G01S 19/08; G01S 19/20; G01S 19/05
See application file for complete search history.

(56) References Cited

U.S. PATENT DOCUMENTS

| | | | |
|---|---|---|---|
| 11,762,100 B2* | 9/2023 | Miyamoto | G01S 5/01 342/357.45 |
| 11,789,161 B2* | 10/2023 | Bennington | G01S 19/28 342/357.61 |
| 2011/0032147 A1* | 2/2011 | Venkatraman | G01S 19/27 342/357.66 |
| 2016/0011318 A1 | 1/2016 | Cohen | |
| 2017/0269222 A1 | 9/2017 | Dai et al. | |

(Continued)

OTHER PUBLICATIONS

International Patent Application No. PCT/CA2022/050233 International Search Report and Written Opinion dated May 16, 2022.
(Continued)

*Primary Examiner* — Timothy A Brainard
*Assistant Examiner* — Kenneth W Good
(74) *Attorney, Agent, or Firm* — Borden Ladner Gervais LLP; Geoffrey deKleine

(57) ABSTRACT

A method of determining performance of GNSS prediction data includes receiving the GNSS prediction data at a server, the GNSS prediction data being associated with a unique identifier, determining performance metrics of the prediction data at a current time and saving the performance metrics of the prediction data in association with the unique identifier, and in response to receipt of a request from an electronic device, sending one or both of the performance metrics of the prediction data associated with the unique identifier and corrections for correcting the prediction data to the electronic device for use by the electronic device.

20 Claims, 4 Drawing Sheets

(56) References Cited

U.S. PATENT DOCUMENTS

| | | | | |
|---|---|---|---|---|
| 2020/0379118 A1* | 12/2020 | Reid | ........................ | G01S 19/02 |
| 2021/0116579 A1* | 4/2021 | Rezaei | .................... | G01S 19/25 |
| 2022/0038359 A1* | 2/2022 | Svennebring | ......... | H04W 24/08 |
| 2023/0003897 A1* | 1/2023 | Kilian | ..................... | G01S 19/07 |
| 2023/0413141 A1* | 12/2023 | Määttänen | ......... | H04B 7/18541 |

OTHER PUBLICATIONS

European Patent Application No. 22755446.6, Extended European Search Report dated Dec. 3, 2024.

\* cited by examiner

METHOD OF DETERMINING AND DISTRIBUTING PERFORMANCE OF GNSS PREDICTION DATA

TECHNICAL FIELD

The present disclosure relates to determining and distributing performance of previous predictions of satellite orbits and clocks data for Global Navigation Satellite System (GNSS) positioning systems.

BACKGROUND

In conventional GNSS assistance services the satellite positions and clocks data is transferred in real-time to electronic devices from an assistance server. The satellite positions and clocks information help electronic devices achieve faster time to first fix and reduce power consumption. However, the real-time GNSS assistance data transfer requires continuous connectivity between the assistance server and the electronic device, and also requires large amount of data transfer. Therefore, it is desirable to send satellite positions and clocks predictions to the electronic devices. The predicted satellite positions and clocks data reduces the overall "cost" of transferring assistance data and avoids the need for continuous connectivity between the assistance server and the electronic device.

The accuracy of the satellite positions and the satellite docks predictions degrades over time. The maGnitude of prediction errors affects the electronic device position accuracy. The prediction errors vary for each satellite independently and the errors normally increase in magnitude with age of the prediction.

The longer that predictions data is utilized, less data is transferred to the electronic device, but at the cost of increased error. Thus, the "refresh time", or how long a device waits before requesting a fresh prediction from the server is a trade-off. Newer predictions are better in terms of accuracy, while each additional prediction downloaded comes at an increased cost.

Improvements in methods to improve the refresh time of predictions are desirable. The improved refresh time reduces the cost of data transfer and power consumption by the electronic device while ensuring reasonable predictions accuracy.

SUMMARY

According to an aspect of an embodiment, a method of determining performance of GNSS prediction data is provided. The method includes receiving the GNSS prediction data at a server, the GNSS prediction data associated with a unique identifier, determining performance metrics of the prediction data at a current time and saving the performance metrics of the prediction data in association with the unique identifier, and in response to receipt of a request from an electronic device, sending one or both of the performance metrics of the prediction data associated with the unique identifier and corrections for correcting the prediction data to the electronic device for use by the electronic device.

According to another aspect of an embodiment, a method of updating GNSS prediction data is provided. The method includes receiving the GNSS prediction data at an electronic device, the GNSS prediction data associated with a unique identifier, utilizing the prediction data for a period of time, receiving one or both of performance metrics of the prediction data associated with the unique identifier and corrections for correcting the prediction data, and in response to determining that performance of the GNSS prediction data is degraded based on one or both of the performance metrics of the prediction data and the corrections, receiving new GNSS prediction data.

According to yet another aspect of an embodiment, there is provided a method of determining performance of GNSS prediction data. The method includes receiving the GNSS prediction data at a server, the GNSS prediction data associated with a unique identifier, determining performance metrics of the GNSS prediction data at a current time, determining if the performance of the GNSS prediction data is degraded based on the performance metrics, and, in response to determining that the performance of the GNSS prediction data is degraded, pushing new prediction data to electronic devices utilizing the GNSS prediction data.

DRAWINGS

The following figures set forth examples in which like reference numerals denote like parts. The present disclosure is not limited to the examples illustrated in the accompanying figures.

Figure 3:
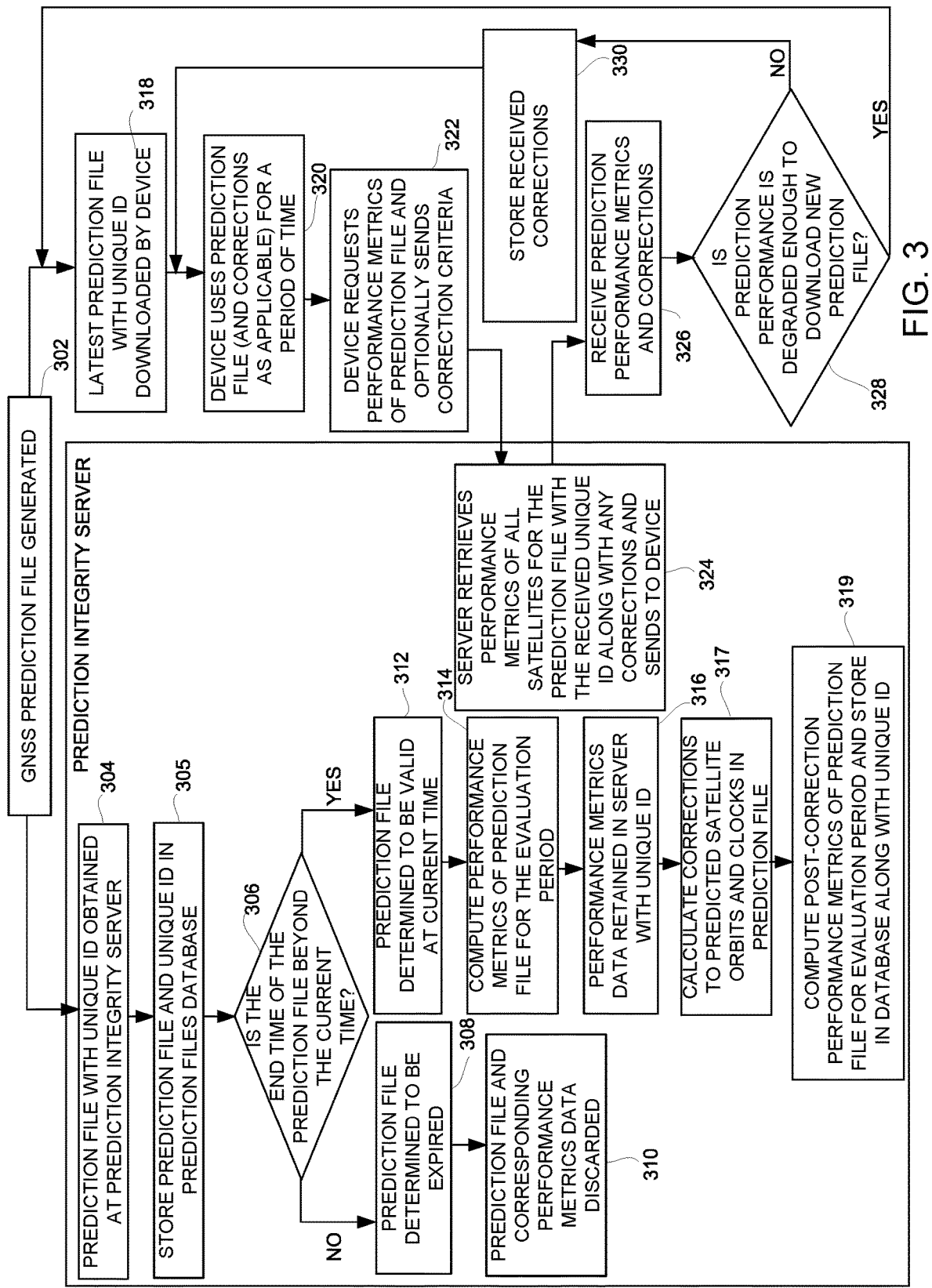
Figure 4:
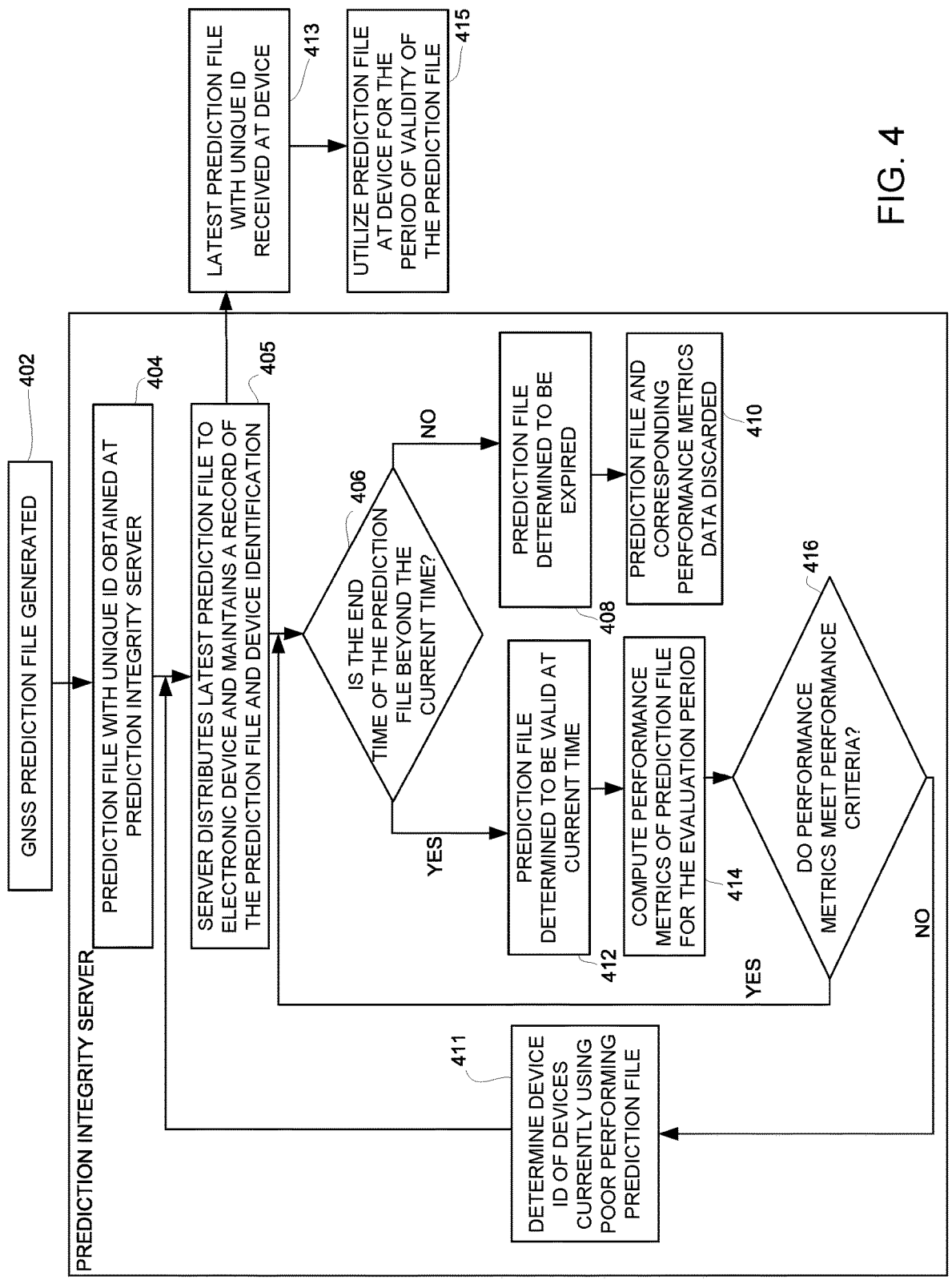

FIG. 3. is a flowchart showing a method of determining and distributing performance metrics of GNSS prediction data and corrections to the prediction data according to an aspect of another embodiment;

FIG. 4 is a flowchart showing a method of determining and distributing performance metrics of GNSS prediction data according to an aspect of yet another embodiment.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. Unless explicitly stated, the methods described herein are not constrained to a particular order or sequence. Additionally, some of the described methods or elements thereof can occur or be performed at the same time. In other instances, well-known methods, procedures and components have not been described in detail so as not to obscure the examples described herein. Also, the description is not to be considered as limiting the scope of the examples described herein.

Satellite positions may be computed from satellite orbits or orbit models. On this basis, the terms satellite positions and orbits are generally used interchangeably in the present description.

Figure 1:
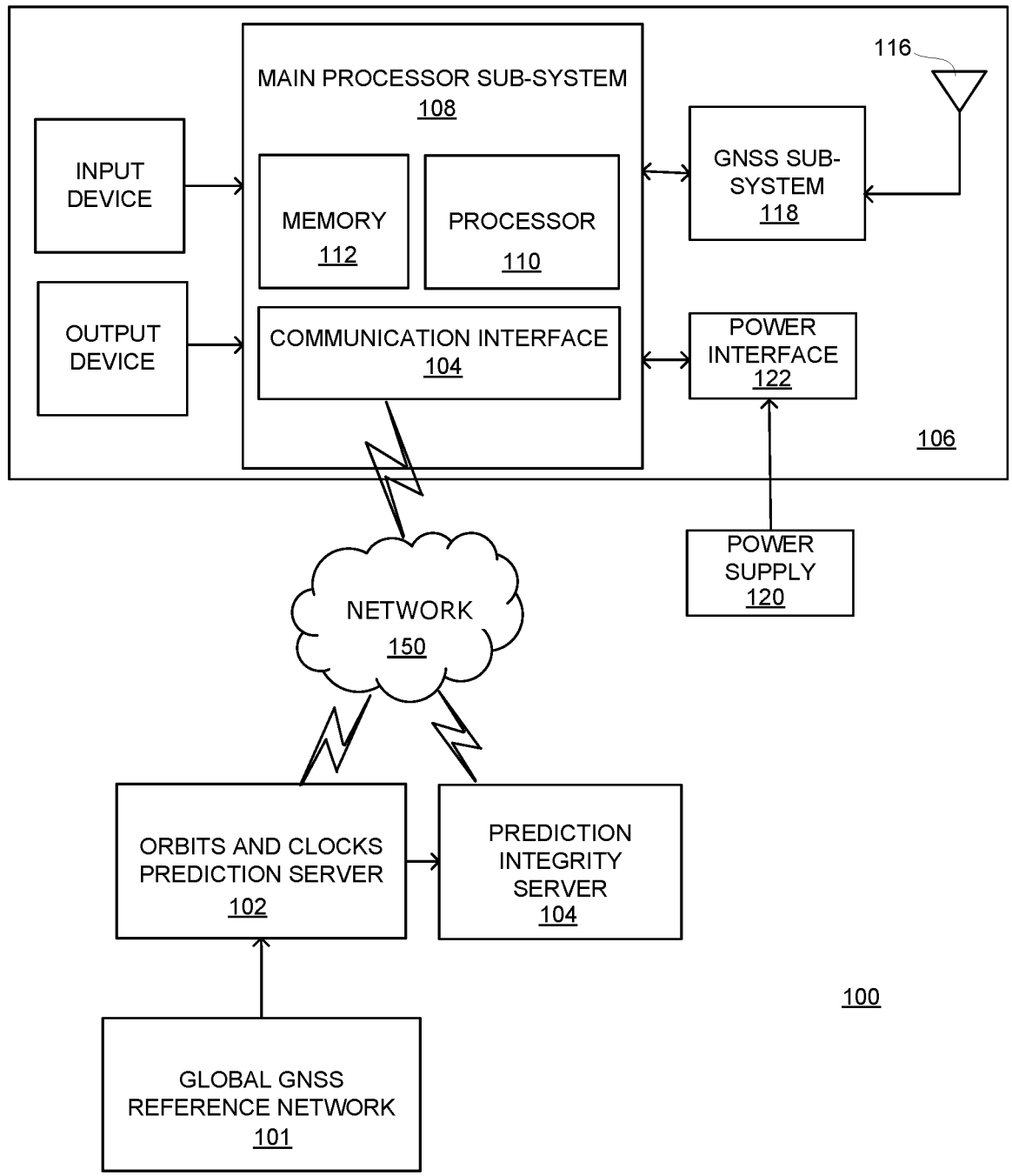
FIG. 1 shows a system for determining and distributing performance metrics of GNSS prediction data in accordance with an aspect of an embodiment.

Referring to FIG. 1, an example of a system 100 for determining performance of GNSS prediction data is shown. The satellite systems for which satellite positions and clocks predictions may be utilized include GPS, GLONASS, Galileo, BeiDou, QZSS, NavIC, and is applicable for new satellite-based navigation systems, including SBAS.

As illustrated in the example of FIG. 1, a server 104, referred to as a prediction integrity server is utilized for determining performance metrics, also referred to herein as prediction integrity, of GNSS prediction data. The server 104 is in communication with an orbits and clocks prediction server 102 utilized for providing satellite positions and clocks predictions. The orbits and clocks prediction server 102 is in communication with a global GNSS reference network 101. The global GNSS reference network 101 includes several GNSS reference stations across the globe for collecting GNSS satellites observations and navigation data and typically has about 50 stations. The reference receivers at surveyed and known locations decode and download navigation data broadcast by GNSS satellites, and make range, range-rate and signal strength observations to signals on two or more frequencies of the GNSS satellites to determine satellite orbits and clocks. Data from the reference network is used to determine satellite orbits and clocks for a period in the past as well as predictions for a future time period at the server 102. The server 102 provides satellite orbits and clocks predictions to the prediction integrity server 104. Alternatively, the server 104 obtains the satellite orbits and clocks predictions from an external source.

The prediction integrity server 104 is in communication with the electronic device 106 via a wireless connection, for example. The electronic device 106 includes a main processor sub-system 108 that controls overall operation thereof. The main processor sub-system 108 includes a processor 110, a memory 112 and a communication interface 114, which enables communication with the prediction integrity server 104 via a wired or a wireless connection. An example of a main processor sub-system 108 is a Single Board Computer (SBC) with an Operating System (OS).

The orbits and clocks prediction server 102 is also in communication with the electronic device 106 via a wireless connection, for example.

A GNSS receiver of the electronic device 106 includes a GNSS antenna 116 for receiving GNSS signals and a GNSS sub-system 118 in communication with the main processor sub-system 108 and the GNSS antenna 116. The GNSS sub-system 118 generates digitized GNSS data corresponding to the GNSS signals for further processing by the main processor sub-system 108, for example. Other examples of a GNSS sub-system 118 include: a standalone GNSS receiver capable of generating a location estimate locally, an Assisted GNSS (A-GNSS) receiver that receives assistance data from another device to provide a location estimate, a Radio Frequency (RF) Front End (FE) in association with a Software Defined Radio (SDR) receiver at the electronic device 106.

The electronic device 106 is powered by a power supply 120, which communicates with the main processor sub-system 108 via a power interface 122. In an example, the power supply 120 is one or more batteries. The electronic device 106 includes an output device 124 in communication with the main processor sub-system 108. The output device 124 may be one or more of a display, a speaker and another type of output device, for example. The electronic device 106 includes an input device 126 in communication with the main processor sub-system 108 to receive user input, for example.

The electronic device 106 may be a Smartphone, tablet, Internet of Things (IoT) device, portable computer, laptop computer, activity tracking device, beacon, router, drone, robot, Machine-to-machine (M2M) device or an in-vehicle navigation system, for example.

As illustrated in FIG. 1, the prediction integrity server 104 is in communication with the orbits and clocks prediction server 102, which is in communication with the GNSS global reference station network 100. The orbits and clocks prediction server 102 is also in communication with the electronic device 106.

As shown in the example of FIG. 1, the orbits and clocks prediction server 102 is in communication with the GNSS global reference network 101, and the orbits and clocks prediction server 102 collects observations and navigation data continuously. The orbits and clocks prediction server 102 stores the observations and navigation data for a period of time and determines satellite orbits and clocks data using the collected data for a period of time in the past. Satellite orbits and clocks are predicted for a future period of time utilizing the determined orbits and clocks and physics models, e.g., period of seven days. Thus, the observations and navigation data from the reference network is utilized to determine orbits and clocks for a period of time in the past as well as predictions for a future time period at the server 102.

Orbits are predicted using orbital mechanics modeling the forces acting on the satellites and with the current best estimates of satellite positions and other parameters. The complete process of orbit determination and prediction can be run at any suitable interval, such as four, six, or 24 times in a day. Similarly, clocks are also predicted by determining trend of the clocks for a past period and then propagating clocks utilizing the trend. The complete process of orbit determination and prediction, clock determination and prediction is run at regular intervals, such as four, six, or 24 times in a day.

Figure 2:
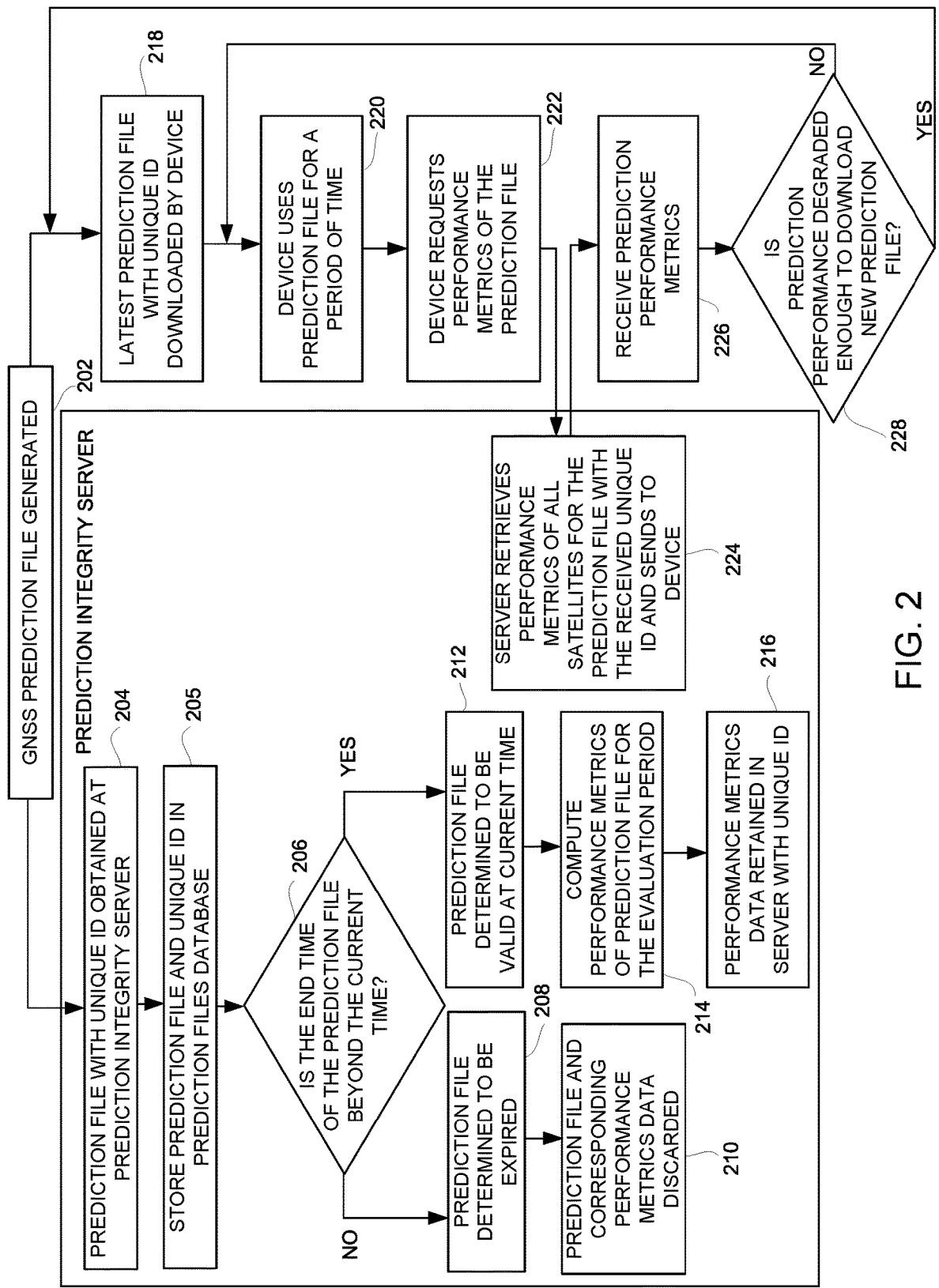
FIG. 2 is a flowchart showing a method of determining and distributing performance metrics of GNSS prediction data in accordance with an aspect of an embodiment.

Reference is made to FIG. 2 to describe a method of determining and distributing performance metrics of previously predicted GNSS satellite orbits and clocks in accordance with an aspect of an embodiment. The method may include additional or fewer elements than shown and described and parts of the method may be performed in a different order than shown or described herein.

The predicted orbits and clocks of GNSS satellites obtained from the orbits and clocks determination and prediction process is created as a set or file for a period of time, e.g., a period of seven days, and assigned a unique identifier by the orbits and clocks prediction server 102 at 202.

Each prediction file including the satellite orbits and clocks predictions along with the unique identifier is provided to the prediction integrity server 104 at 204. The satellite orbits and clocks predictions are provided with an end time, after which the predictions are not considered valid. The end time may be a specific date or a period, such as, for example, 7 days or any other suitable period. The prediction integrity server 104 stores a record of the prediction files, for example, in a database as indicated at 205.

The prediction integrity server 104 checks the satellite orbits and clocks prediction files that are stored in the database to determine whether or not the predictions are still valid at the current time at 206. The prediction integrity server 104 checks each of the prediction files at regular intervals, for example, at half hour, 1 hour, or any other suitable interval. To determine whether or not the predictions are valid, the prediction integrity server 104 checks that the current time is not past the end time of the satellite orbits and clocks prediction files.

If the end time of the prediction file is not past the current time, the prediction integrity server 104 determines that the predictions are valid at the current time at 212 and proceeds to 214.

At 214, the server computes the performance metrics of the predictions by comparing the predicted satellite positions and clocks with reference satellite positions and clocks. The reference satellite positions and clocks are computed using one or both of satellite broadcasted data and real-time observed orbits and clocks received from the server 102 or an external real-time orbits and clocks source. For a prediction file the predicted satellite positions and clocks for an evaluation time period in the recent past are compared with the corresponding reference satellite positions and clocks. As an example, the evaluation time period in the recent past is the latest period of 30 minutes during which the reference satellite positions and clocks are available. Based on this comparison, the deviation of the predictions from the broadcasted or observed data during the evaluation period is utilized to determine the performance metrics of the predictions. Further, the prediction integrity server 104 also checks the latest notice advisories from individual GNSS constellations obtained from their websites or other sources to determine if the satellite orbits and clocks predictions previously made for individual satellites are still valid.

If, however, the current time is past the end time of the prediction file, the server determines at 208 that the prediction file is expired, and the predictions are not valid for the current time. The prediction file is therefore discarded at 210 along with the corresponding performance metrics data determined previously.

The performance metrics of predictions may be computed in any suitable manner. Examples of suitable performance metrics are set out below. Any performance metric or combination of these performance metrics may be utilized.
Performance Metrics:
  Orbit errors, which include a comparison of the reference orbits and predicted orbits. These orbit errors may be determined utilizing radial, along-track, cross-track, 3D, or any other suitable method, for example as root mean square (RMS) errors.
  Clock errors, which include a comparison of the reference clocks and predicted clocks. These errors may utilize aggregate differences of clock correction (af0) terms, standard deviation of these differences, or any other suitable method.
  Observed errors, which include a comparison of pseudorange observations at individual reference receiver locations with ranges calculated using predicted orbits and clocks. These errors give a simulated user range error, for example as an RMS error, for using the prediction at that specific location at that time.
  Performance of predicted standard deviation. Predictions may be issued with a measure of expected accuracy. The expected accuracy may be in the form of a predicted standard deviation (clock and/or orbit) for each individual record, or a URA (User Range Accuracy) index to indicate an expected performance range. The Prediction Integrity Server computes a ratio of this predicted accuracy value against a true real-time accuracy value. This ratio facilitates determination by the electronic device 106 of whether or not the prediction is degrading more than the expected rate.
  Forecasted satellite and constellation changes. Expected current status or future unavailability of satellites in the prediction may be tracked by the Prediction Integrity Server 104. If a satellite is subject to a forecasted change in its orbit or clock in the near future, the binary integrity indicator of the satellite in current predictions may be marked unusable by the prediction integrity server 104.

The performance metrics may include standard deviation. Alternatively, the performance metrics may be a binary integrity indicator. The performance metrics data is stored in the database on the prediction integrity server 104 at 216. For example, the difference between previously predicted satellite orbits and the reference satellite orbits may be computed for the evaluation period as prediction errors and an RMS error value is computed. Similarly, an RMS error value for previously predicted clocks is computed. In another example a performance metric in the form of an accuracy ratio is computed. The clock and orbit predictions may have been issued with a predicted standard deviation value. The accuracy ratio is calculated by dividing the accuracy determined at the current time by the predicted standard deviation, providing an indicator to the device how closely the quality degradation is trending against expected norms. The performance metrics data for each satellite is determined and stored in a database along with the unique identifier.

The process described above with reference to FIG. 2 and reference numerals 206, 212, 214, 216, 208, and 210 is carried out at regular intervals for all of the prediction files stored in the database.

Prediction files are provided to or downloaded by the electronic devices, along with the associated unique identifiers. The electronic device 106 may download a prediction file at 218 at or near the same time that the prediction file is provided to the prediction integrity server 104.

The electronic device 106 utilizes the prediction file for a period of time to compute satellite positions and clocks at 220. The prediction file may be utilized, for example, for a few days. The prediction file is used for determining the satellite positions and clocks at the electronic device 106 without continually receiving real-time data from AGNSS servers or decoding satellite navigation data from signals which utilizes communications bandwidth and increases battery and processing requirements.

After utilizing the prediction file for a period of time, the electronic device 106 requests performance metrics of prediction data from the prediction integrity server 104 by sending a request to the prediction integrity server 104 along with the unique identifier of the prediction file at 222.

The prediction integrity server 106 receives the request and retrieves the performance metrics data that is stored in association with each satellite for that unique identifier, from the database. The prediction integrity server 106 sends the performance metrics data associated with each satellite for the unique identifier to the electronic device 106 at 224.

Additionally, by dividing the performance metrics into discrete bands, multiple satellites of a given constellation may be combined into bands thus reducing the amount of data returned to the electronic device 106. For example, there may be eight bands of prediction performance metrics and a set of satellites' orbit predictions performance lies in a band. The data sent by the prediction server in this case includes band indicator followed by the set of satellite numbers. The server may offer various request/response options with varying levels of granularity and therefore bandwidth, from, for example, a generalized one-bit representation of health for the entire prediction, up to specific performance metrics for each individual satellite.

The electronic device 106 receives the performance metrics data at 226, and based on the data, determines whether or not the predictions are degraded enough at 228 to justify downloading a new prediction file. Depending on the granularity of information received from the server, the determination is made for each satellite for which prediction data is received in the prediction file. Predictions for individual satellites may be considered unusable or degraded sufficiently to justify downloading a new prediction file based on the performance metrics data. Thus, the electronic device 106 determines that predictions for one or more satellites are no longer usable. For example, the electronic device 106 may determine whether the prediction performance metrics are within a threshold value. If the prediction performance metrics are within the threshold value the device continues with 220 else a new prediction file is downloaded at 218. In another example, the prediction performance metrics may be simple binary integrity indicator data, e.g., usable or not usable for each satellite or the entire prediction file.

In response to determining that the prediction performance is not degraded enough to justify downloading a new prediction file, and the process continues at 220. However, this period for which the device uses the prediction file subsequently may be different from the previous period when the device downloaded the latest prediction file.

In response to determining that the prediction performance is degraded enough to justify downloading a new prediction file, the process continues at 218 at which a new prediction file with a new unique identifier is downloaded at the electronic device 106.

Reference is made to FIG. 3 to describe a method of determining and distributing performance metrics and corrections if desired for previously predicted GNSS satellite orbits and clocks data in accordance with an aspect of another embodiment. The method may include additional or fewer elements than shown and described and parts of the method may be performed in a different order than shown or described herein. Many elements of the method of FIG. 3 are similar to those described above with reference to FIG. 2. In the present embodiment, however, the prediction integrity server 104 calculates and provides corrections for satellite orbits and clocks predictions in the prediction file.

As described above with reference to FIG. 2, the predicted orbits and clocks of GNSS satellites is created as a set or file for a period of time, e.g., a period of seven days, and assigned a unique identifier by the orbits and clocks prediction server 102 at 302.

Each prediction file including the satellite orbits and clocks predictions along with the unique identifier is provided to the prediction integrity server 104 at 304. The satellite orbits and clocks predictions are provided with an end time, after which they are not considered valid. The end time may a specific date or a period, such as, for example, 7 days. The prediction integrity server 104 stores a record of the prediction files, for example, in a database as indicated at 305.

The prediction integrity server 104 checks the satellite orbits and clocks prediction files that are stored in the database to determine whether or not the predictions are still valid at the current time at 306. The prediction integrity server 104 checks each of the prediction files that are stored in the database at regular intervals, for example, at half hour, 1 hour, or any other suitable interval. To determine whether or not the predictions are valid, the prediction integrity server 104 checks that the end time of the satellite orbits and clocks predictions file is beyond the current time. In other words, the prediction integrity server checks that the end time of each prediction file has not passed.

If, the end time of the prediction file is beyond the current time, the prediction integrity server 104 determines that the predictions are valid at the current time at 312 and proceeds to 314.

At 314, the server computes the performance metrics of the predictions by comparing the predicted satellite positions and clocks at the current time with reference satellite positions and clocks. The reference satellite positions and clocks are computed using one or both of satellite broadcasted data and real-time observed orbits and clocks received from the server 102 or an external real-time orbits and clocks source. For a prediction file the predicted satellite positions and clocks for an evaluation time period in the recent past are compared with the corresponding reference satellite positions and clocks. As an example, the evaluation time period in the recent past is the latest period of 30 minutes during which the reference satellite positions and clocks are available. Based on this comparison, the deviation of the predictions from the broadcasted or the observed data during the evaluation period is utilized to determine the performance metrics of the predictions. Further, the prediction integrity server 104 also checks the latest notice advisories from individual GNSS constellations obtained from their websites or other sources to determine if the satellite orbits and clocks predictions previously made for individual satellites are still valid.

The performance metrics may include standard deviation or a binary integrity indicator. The performance metrics data is stored in the prediction integrity server 104 at 316. For example, difference between previously predicted satellite orbits and the reference satellite orbits may be computed for the evaluation period as prediction errors and an RMS error value is computed. Similarly, an RMS error value for previously predicted clocks is computed. The performance metrics data for each satellite is determined and stored in a database along with the unique identifier.

In this embodiment, corrections to the predicted satellite orbits and clocks in the prediction file are generated. The corrections, which are an update to previously sent prediction file are calculated at 317. For example, the correction updates can be delta corrections to the previously sent predicted orbit models such as Keplerian orbit parameters and clock polynomial coefficients. The prediction integrity server 104 stores the corrections along with the performance metrics data associated with each satellite for the unique identifier of the prediction file.

At 319, the server computes post-correction performance metrics. The post-correction predicted satellite positions and clocks are compared with the reference satellite positions and clocks for the same evaluation period as at 314 in determing the post-correction performance metrics. The post-correction performance metrics data for each satellite is stored in a database along with the unique identifier of the prediction file.

If, however, the current time is past the end time of the prediction file, the server determines at 308 that the prediction file is expired, and the predictions are not valid for the current time. The prediction file is therefore discarded at 310 along with the corresponding performance metrics data and the corrections determined previously.

The process described above with reference to FIG. 3 and reference numerals 306, 312, 314, 316, 317, 319, 308, and 310 is carried out at regular intervals for all of the prediction files stored in the database.

Prediction files are provided to or downloaded by electronic devices along with the associated unique identifiers. The electronic device 106 may download a prediction file at 318 at or near the same time that the prediction file is provided to the prediction integrity server 104.

The electronic device 106 utilizes the prediction file for a period of time to compute satellite positions and clocks at 320. The prediction file may be utilized, for example, for a few hours. The prediction file is used for determining the satellite positions and clocks at the electronic device 106 without continually receiving real-time data from AGNSS servers or decoding satellite navigation data from signals, which utilizes communications bandwidth and increases battery and processing requirements.

After utilizing the prediction file for a period of time, the electronic device 106 requests performance metrics, or both performance metrics and correction data, from the prediction integrity server 104 by sending a request to the server along with the unique identifier of the prediction file at 322. The request from the electronic device 106 may also include correction criteria. The correction criteria may be a function of one or both of the performance metrics of predictions of individual satellites and the number of satellites. In one example, the correction criteria may stipulate that the server send corrections to predictions of five satellites that have highest prediction errors as indicated by performance metrics data. In another example, the correction criteria may stipulate that the server send corrections to predictions for those satellites for which the performance metrics exceed a specified value.

The prediction integrity server 104 receives the request and retrieves the performance metrics data and the corrections data that is stored in association with each satellite for that unique identifier from the database.

The prediction integrity server 104 sends the performance metrics data associated with each satellite for the unique identifier to the electronic device 106 at 324. Based on the received correction criteria one or both of the corrections determined by the prediction integrity server 104 and the post-correction performance metrics are also provided to the electronic device 106. In one example if the post-correction performance metrics do not meet the correction criteria as requested by the electronic device 106 at 322, the prediction integrity server 104 responds to the request with a binary indication that the prediction integrity is insufficient. Alternatively, the server 104 may send corrections to only those satellites for which the post-correction performance metrics meet the correction criteria.

The electronic device 106 receives prediction performance metrics and corrections at 326. The device determines whether the predictions are degraded enough to justify downloading a new prediction file, or if they are accurate enough to utilize with or without corrections as applicable at 328. In one example, the predictions are determined to be degraded if the post-correction performance metrics are not within a threshold value. In another example the predictions are determined to be degraded if corrections are required to be applied for more than a threshold number of satellites.

In response to determining at 328 that the prediction performance is not degraded enough to justify downloading a new prediction file, the process continues at 330. The corrections received at 326 at the electronic device 106 are stored at 330. The process continues at 320 with the electronic device utilizing the prediction file along with the corrections as applicable for a period of time. However, this period for which the device uses the prediction file (along with corrections as applicable) subsequently may be different from the initial period of usage when the device downloaded the prediction file.

In response to determining that the prediction performance is degraded enough to download a new prediction file at 328, the process continues at 318 where a new prediction file with a new unique identifier is downloaded at the electronic device 106.

Reference is now made to FIG. 4 to describe a method of determining and distributing performance of GNSS prediction data in accordance with an aspect of yet another embodiment. The method may include additional or fewer elements than shown and described and parts of the method may be performed in a different order than shown or described herein. Many elements of the method of FIG. 4 are similar to those described above with reference to FIG. 2. In the present embodiment, however, the prediction integrity server 104 determines if a new prediction file is to be sent to the electronic device 106 based on performance criteria. In an example, the performance criteria is that the orbits and clocks performance metrics are within a threshold value for each satellite.

As described above with reference to FIG. 2, the predicted orbits and clocks of each of the GNSS satellites is created as a set or file for a period of time, e.g., period of seven days, and assigned a unique identifier by the orbits and clocks prediction server 102 at 402.

Each prediction file including the satellite orbits and clocks predictions along with the unique identifier is provided to the prediction integrity server 104 at 404. The satellite orbits and clocks predictions are provided with an end time, after which they not considered valid. The end time may be a specific date or a period, such as, for example, 7 days. The prediction integrity server 104 stores a record of the prediction files, for example, in a database.

The prediction integrity server 104 sends the prediction file to the electronic device 106 and maintains a record at the prediction integrity server 104 of which prediction file is sent to the electronic device 106 at 405, storing the prediction file and its unique identifier in a database along with an identification of the electronic device or electronic devices that are utilizing the prediction file. Thus, the prediction integrity server 104 maintains records of the prediction files that are sent to multiple electronic devices along with the device identification to which the prediction integrity server 104 distributes the prediction files.

The prediction integrity server 104 checks the satellite orbits and clocks prediction files that are stored to determine whether or not the predictions are still valid at the current time at 406. The prediction integrity server 104 checks the prediction files at regular intervals, for example, at half hour, 1 hour, or any other suitable interval. To determine whether or not the predictions are valid, the prediction integrity server 104 checks that the end time of the satellite orbits and clocks predictions file is beyond the current time. In other words, the prediction integrity server checks that the end time of the prediction file has not passed.

If the end time of the prediction file is beyond the current time, the prediction integrity server 104 determines that the predictions are valid at the current time at 412 and proceeds to 414.

At 414, the server 104 computes the performance metrics of the predictions by comparing the predicted satellite positions and clocks at the current time with reference satellite positions and clocks. The reference satellite positions and clocks are computed using one or both of satellite broadcasted data and real-time observed orbits and clocks received from the server 102 or an external real-time orbits and clocks source. For a prediction file the predicted satellite positions and clocks for an evaluation time period in the recent past are compared with the corresponding reference satellite positions and clocks. As an example, the evaluation time period in the recent past is the latest period of 30 minutes during which the reference satellite positions and clocks are available. Based on this comparison, the deviation of the predictions from the broadcasted or observed data during the evaluation period is utilized to determine the performance metrics of the predictions. Further, the prediction integrity server 104 also checks the latest notice advisories from individual GNSS constellations obtained from their websites or other sources to determine if the satellite orbits and clocks predictions previously made for individual satellites are still valid. Additionally, corrections to predicted satellite orbits and clocks in the prediction file may be computed at 414.

The prediction integrity server 104 determines if the performance metrics meet performance criteria at 416. The performance criteria may be a function of one or both of the performance metrics of predictions of individual satellites and the number of satellites. In one example, the performance criteria may be that the performance metrics are not within a threshold value for a specified number of satellites.

If the performance metrics meet the performance criteria the process continues at 406. If, however, the performance metrics do not meet the performance criteria, the prediction file is determined as degraded or poor performing and the process continues at 411.

The prediction integrity server determines which electronic devices are utilizing the poor performing prediction file based on the device identity at 411 and latest prediction file is distributed to those electronic devices, which includes the electronic device 106, at 405. Alternatively, instead of distributing the latest prediction file to the electronic devices with poorly performing prediction files, the corrections computed at 414 can be distributed.

If, however, the current time is past the end time, the prediction integrity server 104 determines at 408 that the prediction file is expired, and the predictions are not valid for the current time. The prediction file is therefore discarded at 410 along with the corresponding performance metrics data and corrections if any determined previously. The method continues at 406.

The process described above with reference to FIG. 4 and reference numerals 406, 412, 414, 416, 411, 408, and 410 is carried out at regular intervals for all of the prediction files stored in the database at the server 104.

The latest prediction file is received at the electronic device 106 at 413 and stored on the device. The electronic device 106 utilizes the prediction file for the period of validity of the prediction file at 415.

Utilizing the presently disclosed methods, performance metrics data of satellite orbits and clocks predictions may be determined by the prediction integrity server and new predictions may be requested by or pushed to the electronic device when the performance metrics are not within an acceptable threshold value or do not meet a performance criterion. Thus, the methods disclosed provide for a means to ensure satellite orbits and clocks predictions are within an acceptable accuracy while limiting data transmission costs and battery and processor requirements at the electronic device.

Specific examples have been shown and described herein. However, modifications and variations may occur to those skilled in the art. All such modifications and variations are believed to be within the scope and sphere of the present disclosure.

The invention claimed is:

1. A method of determining performance of GNSS prediction files, the method comprising:
   repeatedly receiving the GNSS prediction files at a server, each of the GNSS prediction files associated with a respective unique identifier, and storing each of the GNSS prediction files in association with the respective unique identifier such that a plurality of the GNSS prediction files are stored, wherein the GNSS prediction files are provided to electronic devices;
   determining performance metrics of the stored GNSS prediction files at a current time by comparing predicted satellite position and clocks using the GNSS prediction files to satellite position and clocks obtained from broadcasted data or real-time observed orbits and clocks and storing the performance metrics of each of the GNSS prediction files in association with the respective unique identifier, wherein the performance metrics are a measure of accuracy of the predicted satellite position and clocks using the GNSS prediction files;
   receiving, at the server, a request from an electronic device of the electronic devices, for the performance metrics of one of the GNSS prediction files previously provided to the electronic device, the request including the respective unique identifier associated with the one of the GNSS prediction files;
   retrieving, at the server, the performance metrics for the one of the GNSS prediction files previously provided to the electronic device, from the stored performance metrics based on the respective unique identifier included in the request from the electronic device; and
   in response to receipt of the request from the electronic device, sending, by the server, the performance metrics of the one of the GNSS prediction files previously provided to the electronic device.

2. The method of claim 1, wherein receiving the GNSS prediction files comprises receiving predictions for satellite orbits and satellite clocks along with the respective unique identifiers.

3. The method of claim 2, wherein receiving comprises receiving each of the GNSS prediction files with a respective end time after which the predictions are not considered valid.

4. The method of claim 3, comprising, determining, by the server, if a current time is past the respective end time of a GNSS prediction file of the GNSS prediction files.

5. The method of claim 4, comprising, in response to the server determining that the current time is past the respective end time of the GNSS prediction file, discarding the GNSS prediction file and the performance metrics associated with the GNSS prediction file.

6. The method of claim 4, wherein the determining the performance metrics of the prediction files is carried out in response to the server determining that the current time is not past the respective end times of the GNSS prediction files.

7. The method of claim 6, wherein the determining the performance metrics of the GNSS prediction files comprises checking for notice advisories to determine prediction data validity.

8. The method of claim 1, comprising calculating corrections to the one of the GNSS prediction files and storing the corrections along with the unique identifier of the one of the GNSS prediction files at the server.

9. The method of claim 8, comprising sending the corrections to the electronic device in response to determining that correction criteria received from the electronic device are met.

10. A method of updating a GNSS prediction file, the method comprising:
receiving the GNSS prediction file at an electronic device, the GNSS prediction file associated with a unique identifier;
utilizing the prediction file for a period of time;
receiving, at the electronic device, either of performance metrics of the GNSS prediction file associated with the unique identifier, or the performance metrics and corrections for correcting the GNSS prediction file, from a server, the performance metrics based on a comparison of predicted satellite position and clocks using the GNSS prediction file to satellite position and clocks obtained from broadcasted data or real-time observed orbits and clocks, providing a measure of accuracy of the predicted satellite position and clocks using the GNSS prediction file; and
in response to determining that performance of the GNSS prediction file is degraded based on the performance metrics of the GNSS prediction file, downloading, by the electronic device, a new GNSS prediction file that is associated with a new unique identifier that is different from the unique identifier of the GNSS prediction file or utilizing the corrections to correct the GNSS prediction file;
in response to determining that the performance of the GNSS prediction file is not degraded, continuing to use the GNSS prediction file by the electronic device.

11. The method of claim 10, comprising requesting the performance metrics of the GNSS prediction file associated with the unique identifier prior to receiving the performance metrics of the prediction file associated with the unique identifier.

12. The method of claim 11, comprising determining that the GNSS prediction file is degraded by determining that the performance metrics of the GNSS prediction file are outside of a threshold value.

13. The method of claim 12, wherein utilizing the corrections comprises applying the corrections to satellite orbits and satellite clocks in the GNSS prediction file, for each satellite for which corrections are received.

14. A method of determining performance of GNSS prediction files, the method comprising:
repeatedly receiving the GNSS prediction files at a server, each of the GNSS prediction files associated with a respective unique identifier and storing each of the prediction files in association with the respective unique identifier such that a plurality of the prediction files are stored;
determining performance metrics of the GNSS prediction files at a current time by comparing predicted satellite position and clocks using the prediction data to satellite position and clocks obtained from broadcasted data or real-time observed orbits and clocks, the performance metrics providing a measure of accuracy of the predicted satellite position and clocks using the GNSS prediction files;
determining if the performance of one of the GNSS prediction files is degraded based on the performance metrics; and,
in response to determining that the performance of the one of the GNSS prediction files is degraded, pushing a new one of the prediction files to electronic devices that have the one of the GNSS prediction files.

15. The method of claim 14, wherein repeatedly receiving the GNSS prediction files comprises repeatedly receiving predictions for orbits and clocks along with the respective unique identifier at regular intervals in time.

16. The method of claim 15, wherein receiving comprises receiving each of the GNSS prediction files with a respective end time after which the predictions are not considered valid.

17. The method of claim 16, comprising, checking, by the server, the predictions for the orbits and clocks and determining if the predictions are valid based on the end time of the associated one of the prediction files.

18. The method of claim 17, comprising, in response to the server determining that a current time is past the end time of one of the GNSS prediction files, discarding the one of the GNSS prediction files.

19. The method of claim 17, wherein the determining the performance metrics of the GNSS prediction files is carried out in response to the server determining that a current time is not past the end time of the prediction files.

20. The method of claim 14, wherein the determining the performance metrics of the prediction files comprises checking for notice advisories to determine prediction file validity.

* * * * *